(12) United States Patent
Yoshino et al.

(10) Patent No.: US 10,066,120 B2
(45) Date of Patent: Sep. 4, 2018

(54) URETHANE COMPOSITION FOR COATING FILM WATERPROOF MATERIAL

(71) Applicant: DYFLEX CORPORATION, Shinjuku-ku, Tokyo (JP)

(72) Inventors: Kenji Yoshino, Tokyo (JP); Yoichi Kai, Tokyo (JP)

(73) Assignee: DYFLEX CORPORATION, Tokyo (JP)

( * ) Notice: Subject to any disclaimer, the term of this patent is extended or adjusted under 35 U.S.C. 154(b) by 117 days.

(21) Appl. No.: 14/891,543

(22) PCT Filed: May 23, 2014

(86) PCT No.: PCT/JP2014/063741
§ 371 (c)(1),
(2) Date: Nov. 16, 2015

(87) PCT Pub. No.: WO2014/189140
PCT Pub. Date: Nov. 27, 2014

(65) Prior Publication Data
US 2016/0096976 A1    Apr. 7, 2016

(30) Foreign Application Priority Data

May 24, 2013 (JP) .................. 2013-110108

(51) Int. Cl.
| | | |
|---|---|---|
| B05D 7/26 | (2006.01) | |
| C08K 5/00 | (2006.01) | |
| C08G 18/32 | (2006.01) | |
| C08G 18/48 | (2006.01) | |
| C08G 18/66 | (2006.01) | |
| C08G 18/75 | (2006.01) | |
| C09D 7/40 | (2018.01) | |
| C09D 175/04 | (2006.01) | |
| C09D 175/08 | (2006.01) | |
| E04D 7/00 | (2006.01) | |

(52) U.S. Cl.
CPC ............ *C09D 175/04* (2013.01); *B05D 7/26* (2013.01); *C08G 18/324* (2013.01); *C08G 18/3206* (2013.01); *C08G 18/4812* (2013.01); *C08G 18/4825* (2013.01); *C08G 18/4829* (2013.01); *C08G 18/6674* (2013.01); *C08G 18/755* (2013.01); *C08K 5/0016* (2013.01); *C09D 7/40* (2018.01); *C09D 175/08* (2013.01); *E04D 7/00* (2013.01); *B05D 2203/30* (2013.01); *B05D 2503/00* (2013.01); *Y10T 428/31551* (2015.04)

(58) Field of Classification Search
CPC ............ C08G 18/324; C08G 18/4825; C08G 18/4829; C08G 18/6674; C08G 18/755; C08G 18/3206; C08G 18/4812; C08K 5/0016; C09D 175/04; C09D 7/12; C09D 175/08; C09D 7/40; B05D 7/26; B05D 2203/30; B05D 2503/00; E04D 7/00; Y10T 428/31551
See application file for complete search history.

(56) References Cited

U.S. PATENT DOCUMENTS

| | | | | |
|---|---|---|---|---|
| 4,906,720 A | * | 3/1990 | Parfondry | .............. C08G 18/12 528/28 |
| 6,187,859 B1 | * | 2/2001 | Humphrey | ........... C08G 18/227 524/589 |
| 2013/0090428 A1 | | 4/2013 | Tanihara et al. | |

FOREIGN PATENT DOCUMENTS

| | | |
|---|---|---|
| JP | 1-275617 A | 11/1989 |
| JP | 4-213367 A | 8/1992 |
| JP | 4-292683 A | 10/1992 |
| JP | 6-298896 A | 10/1994 |
| JP | 11-240932 A | 9/1999 |
| JP | 2001-72862 A | 3/2001 |
| JP | 2001-329042 A | 11/2001 |
| JP | 2002-173909 A | 6/2002 |
| JP | 2003-313538 A | 11/2003 |
| JP | 2011-80018 A | 4/2011 |
| WO | WO 2013/163799 A1 | 11/2013 |

OTHER PUBLICATIONS

Dow Answer Center, "Dow Polyurethanes-Functionality, OH Number, and Equivalent Weight Definitions", Answer ID 13359, https://dowac.custhelp.com/app/answers/detail/a_id/13359/~/dow-polyurethanes—functionality%2C-oh-number%2C-and-equivalent-weight-definitions, updated Mar. 14, 2017.*
Machine English translation of JP 1994-298896, Saito et al., dated Oct. 25, 1994.*
Notification of Transmittal of Translation of the International Preliminary Report on Patentability (Forms PCT/IB/338 and PCT/IB/373) and the Written Opinion of the International Searching Authority (Form PCT/ISA/237) dated Dec. 3, 2015, by the International Bureau of WIPO in corresponding International Application No. PCT/JP2014/063742. (7 pages).
"JASS 8 Waterproofing and Sealing," Japanese Architectural Standard Specification, (2008), and an English Translation. (11 pages).
"Coating Film Waterproof Material for Architecture," JIS A 6021, (2000), and an English Translation. (27 pages).
"Public Building Construction Standard Specification," building Construction Edition 9, (2007), and an English Translation. (19 pages).

(Continued)

*Primary Examiner* — Patrick Dennis Niland
(74) *Attorney, Agent, or Firm* — Oliff PLC

(57) ABSTRACT

A urethane composition is disclosed for a coating film waterproof material which does not contain any of specific chemical substances, has work efficiency that is the same as that of a general-purpose highly extensible urethane coating film waterproof material, an elongation rate of a highly extensible urethane coating film waterproof material, and strength of a high-strength urethane coating film waterproof material, has no decrease in weather resistance of a top coat resulting from a plasticizer, and is suitable for a non-bleeding type of coating by hand that is not affected by migration of a low fraction of asphalt.

14 Claims, 1 Drawing Sheet

(56) References Cited

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated Dec. 3, 2015, by the International Bureau of WIPO in corresponding International Application No. PCT/JP2014/063741. (6 pages).
The Supplementary European Search Report dated Jan. 17, 2017, by the European Patent Office in corresponding European Application No. 14801396. (9 pages).
International Search Report (PCT/ISA/210) dated Aug. 19, 2014, by the Japanese Patent Office as the International Searching Authority for International Application No. PCT/JP2014/063741.
International Search Report (PCT/ISA/210) dated Jul. 22, 2014, by the Japanese Patent Office as the International Searching Authority for International Application No. PCT/JP2014/063742.

* cited by examiner

URETHANE COMPOSITION FOR COATING FILM WATERPROOF MATERIAL

TECHNICAL FIELD

The present invention relates to a urethane composition for a coating film waterproof material, and particularly relates to a urethane composition for a coating film waterproof material whose type is a non-bleeding type, which has high strength and is highly extensible, and which is suitable for coating by hand.

Priority is claimed on Japanese Patent Application No. 2013-110108, filed on May 24, 2013, the content of which is incorporated herein by reference.

BACKGROUND ART

A urethane coating film waterproof material is used in a wide range of applications including waterproof materials such as roofs, exterior walls, floors, desk slabs, floor slabs, or pits of various structures including civil engineering and construction, and anticorrosion materials.

The urethane coating film waterproof material is largely divided into a two-component reaction type material obtained by mixing an isocyanate prepolymer (primary material), and a compound (curing material) obtained by adding a plasticizer, a filler, a pigment, and a reaction catalyst to polyol and polyamine to produce a mixture, and stirring and curing the mixture; and a one-component type material obtained by coating a material (primary material) which is obtained by adding a filler which has been dried, a plasticizer, a pigment, a reaction catalyst and a moisture latent curing agent, such as ketimine, and oxazolidine, to an isocyanate prepolymer, and being cured with moisture in the air.

Further, examples of a urethane coating film waterproof material of the two-component reaction type include a type of material which is obtained by adding water into a material (primary material) obtained by adding a filler, a plasticizer, a pigment, a reaction catalyst, and magnesium oxide into an isocyanate prepolymer, stirring and reacting them, and allowing magnesium oxide to adsorb carbon dioxide, which is generated by the reaction.

As a general-purpose two-component reaction type urethane coating film waterproof material, the following two types can be exemplified.

(1) A type of material which is obtained by preparing tolylene diisocyanate (hereinafter, also abbreviated to as "TDI")-based prepolymer (primary material) having two or more isocyanate groups by mixing TDI with polypropylene glycol (hereinafter, also abbreviated as "PPG") having two or more hydroxyl groups, heating, and stirring them;

preparing a curing material by adding PPG having two or more hydroxyl groups, a plasticizer, a filler, a pigment, a solvent, an anti-aging agent, an anti-foaming agent, and a reaction catalyst into aromatic amine, such as 3,3'-dichloro-4,4'-diaminodiphenylmethane (hereinafter, also abbreviated as "MOCA") having two or more amino groups, and diethyl toluene diamine (hereinafter, also abbreviated as "DETDA"), and mixing the TDI-based prepolymer and the curing material;

stirring them using a stirrer; and applying the mixture using a spatula or a roller.

(2) An ultra-fast curing type material which is obtained by preparing a diphenyl methane diisocyanate (hereinafter, also abbreviated as "MDI")-based prepolymer having two or more isocyanate groups by mixing MDI having a surplus equivalent ratio with a hydroxyl group equivalent of PPG having two or more hydroxyl groups and reacting the mixture by heating and stirring;

preparing a material (primary material) by adding a plasticizer to the MDI-based prepolymer having two or more isocyanate groups;

preparing a curing material by blending an amine such as DETDA having two or more amino groups and Jeffamine, PPG having two or more hydroxyl groups, a plasticizer, an anti-aging agent, and a reaction catalyst, preparing a material by adding a pigment in which a plasticizer is added and kneaded in advance to the curing material; and heating the mixture of the primary material and the material using a dedicated machine, hose-feeding the mixture to be mixed in a tip of a hose, stirring and performing spray coating.

A urethane coating film waterproof material is capable of easily constructing a seamless waterproof layer after curing on a foundation having a complicated shape by performing coating using a trowel or a spatula, roller-coating, or spray-coating at room temperature. Accordingly, the urethane coating film waterproof material is widely used for renovation, repair, and the like of various structures.

Further, performance of a coating film waterproof material for a roof and a coating film waterproof material for an external wall among coating film waterproof materials for architecture is defined in JIS A 6021 "Coating film waterproof material for architecture" of Japanese Industrial Standards (JIS).

In the coating film waterproof material for a roof defined in JIS A 6021 of Japanese Industrial Standards (JIS), there are two kinds of materials, that is, a highly extensible coating film waterproof material (former group 1) and a high-strength coating film waterproof material as urethane rubber-based materials.

The highly extensible coating film waterproof material (former group 1) for a roof is defined in that the tensile strength at 23° C. is 2.3 N/mm$^2$ or greater and the elongation rate at the time of fracturing between marked lines is 450% or greater.

The high-strength coating film waterproof material for a roof is defined in that the tensile strength at 23° C. is 10.0 N/mm$^2$ or greater and the elongation rate at the time of fracturing between marked lines is 200% or greater.

The highly extensible coating film waterproof material (former group 1) for a roof is used for a balcony of a building or rooftop waterproofing as a general-purpose waterproof material. Meanwhile, the high-strength coating film waterproof material for a roof is used in applications for which strength, water resistance, and hot water resistance are required such as a rooftop parking lot, a slate roof, an underground structure, and a rooftop for planting.

As the highly extensible coating film waterproof material (former group 1) among urethane coating film waterproof materials, a coating film waterproof material belonging to the type (1) which is obtained by combining a TDI prepolymer and MOCA (DETDA), mixing and stirring the mixture in a stirrer, and performing coating using a trowel or a spatula or roller coating has been already commercialized. Since this type of coating film waterproof material is used after the weights of a primary material and a curing material are measured using scales to be divided in containers, and mixed and stirred in a stirrer, the ratio of the primary material to the curing material is set to 1:1 or 1:2 in terms of mass such that measurement can be easily performed. The NCO ratio of the primary material which is a reaction component is in the range of about 3.3% to about 3.8%.

In addition, as the high-strength coating film waterproof material among urethane coating film waterproof materials, an ultra-fast curing type coating film waterproof material belonging to the type (2) which is obtained by heating an MDI-based prepolymer and DETDA separately from each other using a dedicated machine, hose-feeding the MDI-based prepolymer and DETDA to be mixed with each other at the tip of a hose, stirring the mixture, and performing spray-coating on the mixture has been commercialized. In this type of coating film waterproof material, since the primary material and the curing material are fed in a hose from a container having a constant volume to a pump to be mixed at the tip of the hose, stirred, and spray-coated on the mixture, the volume ratio of the primary material to the curing agent is set to 1:1. The NCO ratio of the primary material which is a reaction component is 10.0% or greater.

A difference in the NCO amount becomes a difference in crosslinking density. For this reason, the highly extensible coating film waterproof material (former group 1) whose NCO amount is relatively small has a high elongation rate and low strength. The high-strength coating film waterproof material whose NCO ratio is relatively high has strength stronger than that of the highly extensible coating film waterproof material (former group 1) and has a low elongation rate.

As the urethane coating film waterproof material, the above-described highly extensible type coating film waterproof material (former group 1) has been used most for general purposes. However, from designation in group 2 substances (substances causing chronic and late-onset disorders such as cancer) of Ordinance on Prevention of Dangers due to Specified Chemical Substances (hereinafter, abbreviated as "Specified Chemicals Ordinance") of Occupational Safety and Health Act, prohibition of smoking, eating, and drinking in workplaces (Article 38-2 in Specified Chemicals Ordinance), periodic measurement of the concentration in the air (Articles 36 to 36-4 in Specified Chemicals Ordinance), installation of break rooms (Article 37 in Specified Chemicals Ordinance), and installation of washing and cleaning equipment (Article 38 in Specified Chemicals Ordinance) are obligated with respect to companies or workers using TDI or MOCA in manufacturing processes or civil engineering and construction sites.

Moreover, among Group 1 substances and Group 2 substances, carcinogenic substances or substances suspected to cause cancer are handled as specially controlled substances, and notice of names and precautions (Article 38-3 in Specified Chemicals Ordinance) and storage of records on measurement results of the concentration in the air, work operation of workers, and medical examinations for 30 years (Article 38-4 in Specified Chemicals Ordinance) are required.

In addition, an ultra-fast curing high-strength material obtained by heating an MDI-based prepolymer and DETDA separately from each other using a dedicated machine, hose-feeding the MDI-based prepolymer and DETDA to be mixed at the tip of the hose, stirring, and performing spray coating on the mixture does not have any substances that violate Specified Chemical Ordinance. However, since the dedicated machine has a large scale and mist at the time of spray coating scatters, large-scale curing or the like is required and there are many restrictions.

Since PPG that occupies a large part of the highly extensible (former Group 1) coating film waterproof material and the high-strength urethane coating film waterproof material described above has a hydrophobic methyl group ($-CH_2$) and a hydrophilic ether group ($-O-$) in the main chain thereof, the solubility parameter (SP) value is calculated as 12.0 (molecular weight: 1,000, functional group: 2.0).

As the plasticizer used in the urethane coating film waterproof material, an agent which is not reacted with isocyanate (NCO group) in a main agent such as dibutyl phthalate (9.41), diheptyl phthalate (9.0), dioctyl phthalate (8.90), butyl benzyl phthalate (9.86), dioctyl adipate (8.50), chlorinated paraffin (9.21), or tris-β-chloropropyl phosphate and is highly effective for decreasing the viscosity is used. Further, the numbers in parentheses are SP values.

The highly extensible urethane coating film waterproof material (former Group 1) has a large amount of extender pigment as a filler and the filler absorbs a plasticizer. For this reason, the highly extensible urethane coating film waterproof material has a large amount of plasticizer made by adding the amount of the filler being absorbed to the amount of a plasticizer for obtaining the effect for decreasing viscosity. Meanwhile, since the high-strength urethane coating film waterproof material does not have a filler, the high-strength urethane coating film waterproof material has a small amount of plasticizer to a level in which the effect for decreasing viscosity is obtained and the volume ratio is matched.

The urethane coating film waterproof material becomes a waterproof layer after coating, but the waterproof layer is coated with a finish coating material (top coat) in addition to the highly extensible coating film waterproof material (former Group 1) and the high-strength coating film waterproof material for protecting the waterproof layer from solar radiation when used outdoors. As the kind of the top coat, a material including an acrylic urethane resin as a main component, a material including an acrylic silicon resin as a main component, a material including a fluorine resin as a main component. In addition, there are a strong solvent type material, a weak solvent type material, and a water-based type material in each top coat material. Regardless of the kind of the top coat, Durability Committee of Architectural Institute has reported that degradation of the top coat becomes faster in a case where the top coat is used on the waterproof layer formed of the highly extensible coating film waterproof material (former Group 1).

Moreover, examples of the oldest asphalt as a waterproof material include natural asphalt and vacuum residue asphalt of crude oil. These kinds of asphalt are asphalt whose softening point is set to be high in air at a high temperature and which almost do not flow at room temperature and are used for paving of roads or the like.

Further, polymer hydrocarbons, which are referred to as asphaltene, are colloidally dispersed in a Maltene compound in the asphalt. The asphaltene is a polymer compound generated by aromatic hydrocarbon of a condensed ring being cross-linked using a component that is insoluble in light hydrocarbon such as hexane, and the Maltene compound is a component containing a resin, which is soluble in light hydrocarbon such as hexane, and oil.

In this manner, since the component contents of the asphalt are complicated and the components and the ratios are different depending on locality, the SP value cannot be calculated. However, it is assumed that the SP value of the asphaltene is in the range of 9.0 to 10.0 and the SP value of the Maltene component is approximately 8.0. These SP values are close to the SP value of the plasticizer used in the urethane coating film waterproof material and the compatibility with the plasticizer is high.

At the time of repairing waterproof asphalt or the like, even when the foundation of the asphalt is directly coated with the urethane coating film waterproof material, they are not adhered to each other. When the foundation thereof is coated with the highly extensible urethane coating film waterproof material (former Group 1) after the foundation thereof is coated with a general-purpose TDI-based primer, adhesion force can be obtained, but a low fraction of asphalt migrates to the urethane coating film waterproof material (former Group 1). The migration cannot be suppressed even when a top coat is applied, the low fraction is discolored after migrating to the top coat, and degradation of the top coat is promoted.

Here, a urethane coating film waterproof material which has work efficiency that is the same as that of a general-purpose highly extensible urethane coating film waterproof material (former Group 1), an elongation rate of the highly extensible urethane coating film waterproof material (former Group 1), and physical strength the same as the strength of the high-strength urethane coating film waterproof material, does not cause a decrease in weather resistance of a top coat resulting from a plasticizer, is not affected by migration of a low fraction of asphalt, does not use TDI or MOCA of a specific chemical substance, and has high water resistance and hot water resistance has been desired.

CITATION LIST

Patent Literature

[PTL 1] Japanese Patent No. 3592479

Non-Patent Literature

[NPL 1] JIS A 6021 "Coating Film Waterproof Material for Architecture" 2006
[NPL 2] Building Construction Standard Specification and explanation JASS8, waterproof construction, sixth edition
[NPL 3] Public Building Construction Standard Specification (building construction edition), 2007

SUMMARY OF INVENTION

Technical Problem

The present invention has been made in consideration of the above-described problems, and an object thereof is to provide a urethane composition for a coating film waterproof material which does not contain any specific chemical substance, can be constructed in the same manner as that of a general-purpose highly extensible urethane coating film waterproof material (former Group 1), has an elongation rate similar to that of the highly extensible urethane coating film waterproof material and physical strength the same as the strength of the high-strength urethane coating film waterproof material, does not cause a decrease in weather resistance of a top coat resulting from a plasticizer, and is not affected by migration of a low fraction of asphalt.

Solution to Problem

According to the present invention, a urethane composition for a coating film waterproof material is provided, containing at least:

a primary material (A) which contains an isophorone diisocyanate prepolymer obtained by reacting polypropylene glycol which has two or more hydroxyl groups and whose hydroxyl group equivalent is 1,500 or more, and short-chain polyhydric alcohol with isophorone diisocyanate; and a curing material (B) which contains diethyl toluene diamine, water, polypropylene glycol which has two or more hydroxyl groups and whose hydroxyl group equivalent is 1,500 or more, and a terminal-esterified polyfunctional polyether-based plasticizer or polyoxyalkylene monoalkyl ether acetate ester-based plasticizer.

In the urethane composition for a coating film waterproof material of the present invention, it is preferable that the polypropylene glycol be a low monomer type glycol. It is preferable that the polypropylene glycol be a low monool type glycol with a small amount of by-product (containing unsaturated monool) and the degree of unsaturation is 0.05 meq/g or less.

In the urethane composition for a coating film waterproof material of the present invention, it is preferable that the short-chain polyhydric alcohol be at least one selected from the group consisting of ethylene glycol, dipropylene glycol, 1,3-propanediol, 2-methyl 1,3-propanediol, 1,4-butanediol, 3-methyl 1,5-pentanediol, 1,6-hexanediol, glycerin, and trimethylol propane.

Advantageous Effects of Invention

A urethane composition for a coating film waterproof material of the present invention has an elongation rate similar to that of a general-purpose highly extensible urethane coating film waterproof material (former Group 1), can be constructed in the same manner as that of the highly extensible urethane coating film waterproof material, and has strength of a high-strength urethane coating film waterproof material. Accordingly, the urethane composition for a coating film waterproof material having physical properties according to applications including a highly extensible urethane coating film waterproof material (former Group 1) used for normal roofs or a high-strength urethane coating film waterproof material used for exposed waterproof material in a rooftop parking lot can be provided.

Moreover, since weather resistance of a top coat resulting from a plasticizer is not decreased, the urethane composition for a coating film waterproof material can be provided for applications, for which long-term durability is required, such as articles or sites in which maintenance is not easily done.

Further, since the urethane composition for a coating film waterproof material is not affected by migration of a low fraction of asphalt, the urethane composition can be provided as a coating film waterproof material for applications such as renovation or repair according to an exposed asphalt waterproof construction method.

Currently, a urethane coating film waterproof material which does not use TDI or MOCA that is a specific chemical substance and has high water resistance and hot water resistance is desired. The urethane composition for a coating film waterproof material is used for applications such as in a kitchen or a bathroom in which concrete or mortar for which water resistance is required is poured.

Further, since the urethane composition for a coating film waterproof material does not contain any of specific chemical substances in Occupational Safety and Health Act, an impact on health of workers handling the urethane composition for a coating film waterproof material in manufacturing processes or civil engineering and construction sites is reduced.

DESCRIPTION OF EMBODIMENTS

Figure 1:
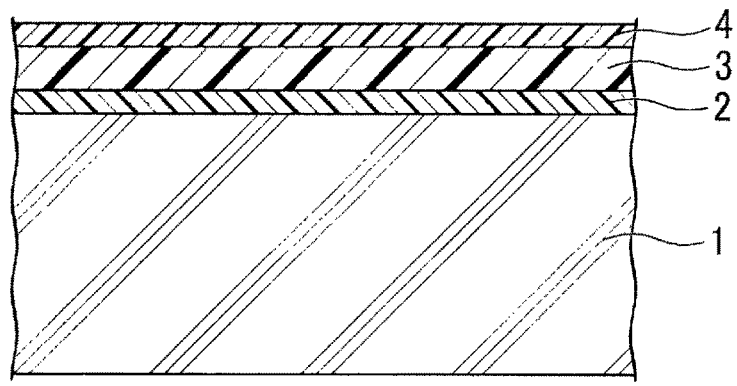
FIG. 1 is a cross-sectional view schematically illustrating a concrete roof which is waterproof-coated with a urethane composition for a coating film waterproof material of the present invention.

An embodiment of a urethane composition for a coating film waterproof material of the present invention will be described.

Further, the present embodiment will be described in detail for convenience of understanding the scope of the invention and is not intended to limit the present invention unless otherwise noted.

[Urethane Composition for Coating Film Waterproof Material]

The urethane composition for a coating film waterproof material of the present invention contains at least a primary material (A) that contains an isophorone diisocyanate prepolymer generated by reacting polypropylene glycol which has two or more hydroxyl groups and whose hydroxyl group equivalent is 1,500 or more, and a short-chain diol, with isophorone diisocyanate; and a curing material (B) which contains diethyl toluene diamine, polypropylene glycol which has two or more hydroxyl groups and whose hydroxyl group equivalent is 1,500 or more, and a plasticizer including terminal-esterified polyfunctional polyether or polyoxyalkylene monoalkyl ether acetate ester.

[Primary Material (A)]

As the polypropylene glycol which has two or more hydroxyl groups and whose hydroxyl group equivalent is 1,500 or more, D-4000 (ACCLAIM 4200 manufactured by Bayer AG, PREMINOL S-4004 manufactured by ASAHI GLASS CO., LTD.) or T-5000 (ACTCOL MN5000 manufactured by Mitsui Chemicals, Inc., Sunnix GH-5000NS and GP-5000 manufactured by Sanyo Chemical Industries, Ltd.) is preferably used.

When PPG whose equivalent is 1,500 or more is used, the amount of isophorone diisocyanate (hereinafter, also abbreviated as "IPDI"), which is an expensive isocyanate, to be used is reduced and thus NCO % in the primary material (A) can be suppressed to be low. Meanwhile, in a case where PPG whose hydroxyl group equivalent is less than 1,500 is used, the amount of IPDI to be used becomes increased and thus the product cost is increased.

The number-average molecular weight of the PPG is preferably in the range of 3,000 to 6,000.

Further, the hydroxyl value (OH value) of the PPG is preferably in the range of 28 to 57.

Further, as the PPG having a high number-average molecular weight, a low monomer type with a small amount of by-products (containing unsaturated monool) is preferable.

Preferable examples of polyhydric alcohol (polypropylene glycol which includes two or more hydroxyl groups and whose hydroxyl group equivalent is 1,500 or more or short-chain polyhydric alcohol), which are not particularly limited, include ethylene glycol, dipropylene glycol, 1,3-propanediol, 2-methyl 1,3-propanediol, 1,4-butanediol, 3-methyl 1,5-pentanediol, 1,6-hexanediol, glycerin, and trimethylol propane.

In terms of the strength of the curing material of the urethane composition for a coating film waterproof material among these polyhydric alcohols, a short-chain diol such as 1,3-propanediol, 2-methyl 1,3-propanediol, or 1,4-butanediol is preferable.

The blending ratio between PPG which has two or more hydroxyl groups, and whose hydroxyl group equivalent is 1,500 or more and a short-chain diol and IPDI which constitute an IPDI prepolymer is preferably in the range of 1.8 to 2.2 and more preferably in the range of 1.9 to 2.1 in terms of the molar equivalent ratio (NCO/OH) of an isocyanate group (NCO group) of IPDI to a hydroxyl group (OH group) of PPG.

When the molar equivalent ratio (NCO/OH) is less than 1.8, the viscosity of the IPDI prepolymer is increased and the amount of dilution of a solvent for adjusting the primary material (A) is increased. Further, the NCO % in the primary material (A) becomes decreased and the use amount of diethyl toluene diamine which is a liquid reaction component of the curing material (B) and PPG whose hydroxyl group equivalent is 1,500 or more is decreased. For this reason, as a product, in a case where the blending ratio of the primary material (A) to the curing material (B) is set to 1:1 (weight ratio), a polyoxyalkylene monoalkyl ether acetate ester-based plasticizer or a solvent which is a liquid component is increased and thus degradation of physical properties or curing shrinkage of the curing material is caused. Meanwhile, when the above-described molar equivalent ratio (NCO/OH) exceeds 2.2, the amount of expensive IPDI to be used is increased and the product cost becomes increased. Further, the amount of monomers of IPDI having two or more isocyanate groups having different reactivity is increased, the curing properties of the curing material are influenced and the physical properties of the curing material are degraded.

A curing catalyst may be added to the primary material (A).

As the curing catalyst, dibutyl tin dilaurate or dibutyl tin diacetate is exemplified.

The blending ratio of divalent PPG which has two or more hydroxyl groups and whose hydroxyl group equivalent is 1,500 or more, trivalent PPG, and a short-chain diol is preferably in the range of 8:3:0 to 3:3:0 and more preferably in the range of 5:3:2 to 4:3:3.

In order to generate an IPDI prepolymer, PPG which includes two or more hydroxyl groups and whose hydroxyl group equivalent is 1500 or more, a short-chain diol, IPDI, and a curing catalyst are mixed in the above-described blending ratio, and the liquid mixture is stirred, heated, and reacted.

The temperature (reaction time) at which the liquid mixture is heated is preferably in the range of 80° C. to 95° C. and more preferably in the range of 85° C. to 90° C.

Further, the time (reaction time) for which the liquid mixture is heated is preferably in the range of 1.0 hour to 3.0 hours and more preferably in the range of 1.5 hours to 2.0 hours.

With the reaction, an IPDI prepolymer which has fluidity at room temperature is obtained. The obtained IPDI prepolymer contains 98% by mass to 100% by mass of a urethane prepolymer in which IPDI is added to PPG.

Moreover, a solvent may be added to the primary material (A) such that the primary material (A) is diluted and the properties such as the viscosity of the primary material (A) may be adjusted.

The solvent is not particularly limited as long as the solvent dissolves the IPDI prepolymer, and examples thereof include Suwa Clean (manufactured by Maruzen Petrochemical Co., Ltd.) in terms of the environment.

The primary material (A) obtained by adding 1.0% by mass to 4.0% by mass of a solvent to the IPDI prepolymer contains 2.4% by mass to 3.0% by mass of an isocyanate group.

[Curing Material (B)]

Diethyl toluene diamine (hereinafter, abbreviated as "DETDA") having two or more amino groups is currently used by being combined with an ultra-fast curing MDI-based prepolymer which is a high-strength urethane coating film waterproof material.

DETDA has reactivity higher than that of MOCA used by being combined with the TDI prepolymer and is capable of obtaining high physical properties. However, in a case where DETDA is used in combination with MDI or TDI, coating is manually performed and thus usable time cannot be sufficiently obtained.

As the PPG which has two or more hydroxyl groups and whose hydroxyl group equivalent is 1,500 or more, PPG which is the same as that used in the primary material (A) is used.

When PPG whose hydroxyl group equivalent is 1,500 or more is used, a product that has a small hydroxyl group equivalent and high reactivity can be obtained in a case where the blending ratio of the primary material (A) to the curing material (B) in the product is set to 1:1 (weight ratio). Further, even when the amount of DETDA to be used for securing high physical properties is increased, the liquid content can be secured. Meanwhile, in a case where PPG whose hydroxyl group equivalent is less than 1500, the use amount of a terminal-esterified polyfunctional polyether-based or polyoxyalkylene monoalkyl ether acetate ester-based plasticizer other than reaction components becomes increased and thus high physical properties cannot be obtained.

The ratio (equivalent ratio: (NCO equivalent)/(NH$_2$+OH equivalent)) between the isocyanate (NCO) equivalent of the primary material (A) and the equivalent in which the equivalent of an amino group (NH$_2$) of the curing material (B) is combined with the equivalent of a hydroxyl group (OH) is preferably in the range of 1.0 to 1.3 and more preferably in the range of 1.1 to 1.2. When the (NCO equivalent)/(NH$_2$+OH equivalent) is less than 1.0, the physical properties of the curing material of the urethane composition of a coating film waterproof material are degraded, curing failure may easily occur, and adhesion to the top coat becomes poor. Further, when the (NCO equivalent)/(NH$_2$+OH equivalent) exceeds 1.3, the curing material of the urethane composition for a coating film waterproof material is easily foamed due to influence of the water content at the time of construction in a high temperature and high humidity environment.

In the curing material (B), the equivalent ratio (NH$_2$ equivalent of DETDA:NH$_2$ equivalent of water: OH equivalent of PPG) of the NH$_2$ equivalent of DETDA having an amino group, the equivalent of NH$_2$ generated by the reaction between water and isocyanate, and the OH equivalent of PPG having a hydroxyl group is preferably in the range of 90:0:10 to 50:30:20 and more preferably in the range of 85:0:15 to 70:15:15.

When the NH$_2$ equivalent of DETDA exceeds 90, a urea bond is increased in the curing material of the urethane composition for a coating film waterproof material and thus high physical properties can be obtained. However, in a case where the blending ratio of the primary material (A) to the curing material (B) in a product is set to 1:1 (weight ratio), the molecular weight of PPG being used becomes increased and the viscosity of the product becomes increased. Further, since the reactivity becomes faster, curing properties are excellent in winter, but the usable time for construction in summer cannot be sufficiently obtained. Further, when the NH$_2$ equivalent of DETDA is less than 70, high physical properties in the curing material of the urethane composition for a coating film waterproof material cannot be obtained.

When the NH$_2$ equivalent of DETDA and the NH$_2$ equivalent in which water can be reacted with isocyanate become 55 to 70, reactivity is degraded and the usable time for construction in summer can be sufficiently obtained. Meanwhile, when the NH$_2$ equivalent of DETDA and the NH$_2$ equivalent in which water can be reacted with isocyanate become less than 55, foaming easily occurs at the time of curing a non-bleeding high-strength and highly extensible manually coating urethane coating film waterproof composition.

The blending amount of a terminal-esterified polyfunctional polyether-based or polyoxyalkylene monoalkyl ether acetate ester-based plasticizer in the curing material (B) is preferably in the range of 0% by mass to 8.0% by mass and more preferably in the range of 2.0% by mass to 4.0% by mass based on the total amount of the curing material (B).

When the blending amount of the terminal-esterified polyfunctional polyether-based or polyoxyalkylene monoalkyl ether acetate ester-based plasticizer is 0% by mass, the viscosity of a product capable of obtaining high physical properties becomes higher. Further, the blending amount of the terminal-esterified polyfunctional polyether-based or polyoxyalkylene monoalkyl ether acetate ester-based plasticizer exceeds 8.0% by mass, and the viscosity of a product is decreased, but high physical properties cannot be obtained.

An inorganic filler such as calcium carbonate, talc, kaolin, zeolite, or diatomite may be added to the curing material (B).

Further, a solvent may be added to the curing material (B) such that the curing material (B) is diluted and the properties such as the viscosity of the curing material (B) may be adjusted.

The solvent is not particularly limited as long as the solvent dissolves diethyl toluene diamine, polypropylene glycol which has two or more hydroxyl groups and whose hydroxyl group equivalent is 1,500 or more, and a terminal-esterified polyfunctional polyether-based or polyoxyalkylene monoalkyl ether acetate ester-based plasticizer, and examples thereof include Suwa Clean (manufactured by Maruzen Petrochemical Co., Ltd.) in terms of the environment.

Further, an anti-foaming agent or an anti-aging agent may be added to the curing material (B).

The curing material (B) is prepared by mixing DETDA, PPG which has two or more hydroxyl groups and whose hydroxyl group equivalent is 1,500 or more, and a terminal-esterified polyfunctional polyether-based or polyoxyalkylene monoalkyl ether acetate ester-based plasticizer at the above-described blending ratio in a nitrogen atmosphere and stirring the mixture at room temperature.

Further, when the curing agent (B) is prepared, an inorganic filler and a moisture latent curing agent may be added thereto.

The time for stirring the mixture is preferably in the range of 0.25 hours to 1.0 hour and more preferably in the range of 0.4 hours to 0.6 hours.

It is preferable that the mixture be uniformly mixed, an anti-foaming agent, an anti-aging agent, and a solvent are added thereto, and then the mixture is stirred for approximately 0.1 hours.

[Urethane Composition for Coating Film Waterproof Material]

The urethane composition for a coating film waterproof material is prepared by, for example, adding the curing agent (B) to the primary material (A), stirring the mixture at room temperature, and then mixing the mixture.

The blending ratio of the primary material (A) to the curing material (B) is preferably in the range of 1.1:0.9 to 0.9:1.0 and more preferably in the range of 1.05:0.95 to 0.95:1.05 in terms of mass.

In the obtained urethane composition for a coating film waterproof material, it is considered that 75% to 85% of NCO and $NH_2$ form a urea bond in the reaction of the primary material (A) and the curing agent (B).

Since the urethane composition for a coating film waterproof material of the present invention has work efficiency which is the same as that of a general-purpose highly extensible urethane coating film waterproof material (former Group 1), an elongation rate of the highly extensible urethane coating film waterproof material (former Group 1), and strength of the high-strength urethane coating film waterproof material, the urethane composition for a coating film waterproof material having physical properties according to applications including a highly extensible urethane coating film waterproof material (former Group 1) used for normal roofs or a high-strength urethane coating film waterproof material used for exposed waterproof material in a rooftop parking lot can be provided.

Moreover, since weather resistance of a top coat resulting from a plasticizer is not decreased, the urethane composition for a coating film waterproof material can be provided for applications, for which long-term durability is required, such as articles or sites in which maintenance is not easily done.

Further, since the urethane composition for a coating film waterproof material is not affected by migration of a low fraction of asphalt, the urethane composition can be provided as a coating film waterproof material for applications such as in renovation or repair according to an exposed asphalt waterproof construction method.

Currently, a urethane coating film waterproof material which does not use TDI or MOCA that is a specific chemical substance and has high water resistance and hot water resistance is desired. The urethane composition for a coating film waterproof material of the present invention is used for applications such as in a kitchen or a bathroom in which concrete or mortar for which water resistance is required is poured because the urethane composition for a coating film waterproof material has hydrophobicity with an SP value in which asphalt is uniformly dispersed.

Further, since the urethane composition for a coating film waterproof material of the present invention does not contain any of specific chemical substances in Occupational Safety and Health Act, an impact on workers handling the urethane composition for a coating film waterproof material in manufacturing processes or civil engineering and construction sites is reduced.

[Usage Example of Urethane Composition for Coating Film Waterproof Material]

Next, a usage example of the urethane composition for a coating film waterproof material of the present invention will be described.

FIG. 1 is a cross-sectional view schematically illustrating a concrete roof which is waterproof-coated with the urethane composition for a coating film waterproof material of the present invention.

In FIG. 1, the reference numeral 1 indicates concrete of a roof portion, the reference numeral 2 indicates primer, the reference numeral 3 indicates a waterproof layer, and the reference numeral 4 indicates a top coat.

The waterproof layer 3 is formed by coating the surface of the concrete 1 of a roof portion with the urethane composition for a coating film waterproof material of the present invention through the primer 2 and curing the coating film.

Figure 2:
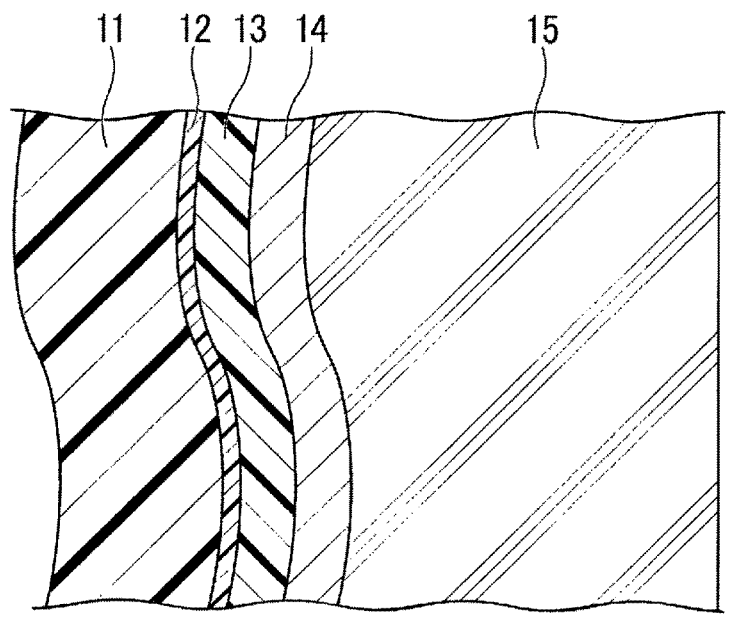
FIG. 2 is a cross-sectional view schematically illustrating indoor waterproofing of a concrete structure which is waterproof-coated with the urethane composition for a coating film waterproof material of the present invention.

FIG. 2 is a cross-sectional view schematically illustrating indoor waterproofing of a concrete structure which is waterproof-coated with the urethane composition for a coating film waterproof material of the present invention.

In FIG. 2, the reference numeral 11 indicates floor slab concrete, the reference numeral 12 indicates primer, the reference numeral 13 indicates a waterproof layer, the reference numeral 14 indicates an interlayer adhesive, and the reference numeral 15 indicates finishing concrete.

The waterproof layer 13 is formed by coating the surface of the floor slab concrete 11 with the urethane composition for a coating film waterproof material of the present invention through the primer 12 and curing the coating film.

EXAMPLES

Hereinafter, the present invention will be described in detail with reference to Examples, but the present invention is not limited to Examples below.

Preparation Example 1: Preparation of Primary Material (A)

Into a solution in which polypropylene glycol whose number-average molecular weight was 4000 (D-4000, trade name: PREMINOL S-4004, hydroxyl group equivalent: 1,865 to 2,155, OH value: 28±2, manufactured by ASAHI GLASS CO., LTD.), polypropylene glycol whose number-average molecular weight was 5,000 (T-5000, trade name: GP-5000, hydroxyl group equivalent: 1,600 to 1,810, OH value: 33±2, manufactured by Sanyo Chemical Industries, Ltd.), and polypropylene glycol whose number-average molecular weight was 2,000 (D-2000, trade name: Diol 2000, hydroxyl group equivalent: 965 to 1,040, OH value: 56±2, manufactured by Mitsui Chemicals, Inc.) were measured at a mass ratio of 25.7:34.5:25.9 and mixed with each other, IPDI (trade name: IPDI, manufactured by Daicel-Evonik Ltd.) whose number-average molecular weight was 222 and molar equivalent ratio (NCO/OH) was 2.00 was added such that the mass ration of the IPDI with respect to 100% by mass of a primary material was 13.8% by mass by taking the water content in polypropylene glycol into consideration. After that, the obtained liquid mixture was stirred and heated, 0.1 parts of a catalyst Formate S-9 (manufactured by Mitsui Chemicals, Inc.) was added thereto, and the mixture was reacted at 95° C. for 2.5 hours, thereby obtaining a urethane polymer.

2.5 parts by mass of a solvent (trade name: Swan clean 150, manufactured by Maruzen Petrochemical Co., Ltd.) was added while the mixture was stirred at the time point when the urethane polymer liquid was cooled to 40° C. and a urethane polymer (primary material (A) (a listed in Table 1)) with fluidity was obtained.

The urethane polymer contained 28.6% of D-4000 to which IPDI was added, 39.1% of T-5000 to which IPDI was added, 31.6% of D-2000 to which IPDI was added, 0.6% of an IPDI monomer, and 2.60% of an isocyanate group.

Preparation Example 2: Preparation of Primary Material (A)

A urethane prepolymer with fluidity (primary material (A) (b listed in Table 1)) was obtained in the same manner as in Preparation Example 1 except that polypropylene glycol whose number-average molecular weight was 4,000 (D-4000, trade name: PREMINOL S-4004, hydroxyl group equivalent: 1,865 to 2,155, OH value: 28±2, manufactured by ASAHI GLASS CO., LTD.), polypropylene glycol whose number-average molecular weight was 5,000 (T-5000, trade name: GP-5000, hydroxyl group equivalent: 1,600 to 1,810, OH value: 33±2, manufactured by Sanyo Chemical Industries, Ltd.), and polypropylene glycol whose number-average molecular weight was 1,000 (D-1000, trade name: Diol 1000, hydroxyl group equivalent: 485 to 515, OH value: 112±3, manufactured by Mitsui Chemicals, Inc.) were measured at a mass ratio of 44.2:33.2:8.8 and mixed with each other.

The urethane polymer contained 49.5% of D-4000 to which IPDI was added, 37.8% of T-5000 to which IPDI was added, 12.1% of D-1000 to which IPDI was added, 0.6% of an IPDI monomer, and 2.60% of an isocyanate group.

Preparation Example 3: Preparation of Primary Material (A)

A urethane prepolymer with fluidity (primary material (A) (c listed in Table 1)) was obtained in the same manner as in Preparation Example 1 except that polypropylene glycol whose number-average molecular weight was 4,000 (D-4000, trade name: PREMINOL S-4004, hydroxyl group equivalent: 1,865 to 2,155, OH value: 28±2, manufactured by ASAHI GLASS CO., LTD.), polypropylene glycol whose number-average molecular weight was 5,000 (T-5000, trade name: GP-5000, hydroxyl group equivalent: 1,600 to 1,810, OH value: 33±2, manufactured by Sanyo Chemical Industries, Ltd.), and polypropylene glycol whose number-average molecular weight was 400 (D-400, trade name: Diol 400, hydroxyl group equivalent: 190 to 210, OH value: 280±10, manufactured by Mitsui Chemicals, Inc.) were measured at a mass ratio of 50.0:33.2:2.9 and mixed with each other.

The urethane polymer contained 55.9% of D-4000 to which IPDI was added, 37.7% of T-5000 to which IPDI was added, 5.9% of D-400 to which IPDI was added, 0.6% of an IPDI monomer, and 2.60% of an isocyanate group.

Preparation Example 4: Preparation of Primary Material (A)

A urethane prepolymer with fluidity (primary material (A) (d listed in Table 1)) was obtained in the same manner as in Preparation Example 1 except that polypropylene glycol whose number-average molecular weight was 4,000 (D-4000, trade name: PREMINOL S-4004, hydroxyl group equivalent: 1,865 to 2,155, OH value: 28±2, manufactured by ASAHI GLASS CO., LTD.), polypropylene glycol whose number-average molecular weight was 5,000 (T-5000, trade name: GP-5000, hydroxyl group equivalent: 1,600 to 1,810, OH value: 33±2, manufactured by Sanyo Chemical Industries, Ltd.), and polypropylene glycol whose number-average molecular weight was 200 (D-200, trade name: PP 200, hydroxyl group equivalent: 95 to 105, OH value: 560±15, manufactured by Sanyo Chemical Industries, Ltd.) were measured at a mass ratio of 51.5:33.3:1.4 and mixed with each other.

The urethane polymer contained 57.4% of D-4000 to which IPDI was added, 37.7% of T-5000 to which IPDI was added, 4.3% of D-200 to which IPDI was added, 0.6% of an IPDI monomer, and 2.61% of an isocyanate group.

Preparation Example 5: Preparation of Primary Material (A)

A urethane prepolymer with fluidity (primary material (A) (e listed in Table 1)) was obtained in the same manner as in Preparation Example 1 except that polypropylene glycol whose number-average molecular weight was 4,000 (D-4000, trade name: PREMINOL S-4004, hydroxyl group equivalent: 1,865 to 2,155, OH value: 28±2, manufactured by ASAHI GLASS CO., LTD.), polypropylene glycol whose number-average molecular weight was 5,000 (T-5000, trade name: GP-5000, hydroxyl group equivalent: 1,600 to 1,810, OH value: 33±2, manufactured by Sanyo Chemical Industries, Ltd.), and 1,4-butanediol whose number-average molecular weight was 90 (1,4-BD, hydroxyl group equivalent: 45, OH value: 1,247, manufactured by Mitsubishi Chemical Corporation) were measured at a mass ratio of 53.9:31.6:0.6 and mixed with each other.

The urethane polymer contained 60.0% of D-4000 to which IPDI was added, 35.9% of T-5000 to which IPDI was added, 3.6% of 1,4-butanediol to which IPDI was added, 0.6% of an IPDI monomer, and 2.58% of an isocyanate group.

Preparation Example 6: Preparation of Primary Material (A)

A urethane prepolymer with fluidity (primary material (A) (f listed in Table 1)) was obtained in the same manner as in Preparation Example 1 except that polypropylene glycol whose number-average molecular weight was 4,000 (D-4000, trade name: PREMINOL S-4004, hydroxyl group equivalent: 1,865 to 2,155, OH value: 28±2, manufactured by ASAHI GLASS CO., LTD.), polypropylene glycol whose number-average molecular weight was 5,000 (T-5000, trade name: GP-5000, hydroxyl group equivalent: 1,600 to 1,810, OH value: 33±2, manufactured by Sanyo Chemical Industries, Ltd.), and 2-methyl 1,3-propanediol whose number-average molecular weight was 90 (2-MPD, hydroxyl group equivalent: 45, OH value: 1,223±20) were measured at a mass ratio of 53.9:31.7:0.6 and mixed with each other.

The urethane polymer contained 60.0% of D-4000 to which IPDI was added, 35.9% of T-5000 to which IPDI was added, 3.6% of 2-methyl 1,3-propanediol to which IPDI was added, 0.5% of an IPDI monomer, and 2.60% of an isocyanate group.

Preparation Example 7: Preparation of Primary Material (A)

A urethane prepolymer with fluidity (primary material (A) (g listed in Table 1)) was obtained in the same manner as in Preparation Example 1 except that polypropylene glycol whose number-average molecular weight was 4,000 (D-4000, trade name: PREMINOL S-4004, hydroxyl group equivalent: 1,865 to 2,155, OH value: 28±2, manufactured by ASAHI GLASS CO., LTD.), polypropylene glycol whose number-average molecular weight was 5,000 (T-5000, trade name: GP-5000, hydroxyl group equivalent: 1,600 to 1,810, OH value: 33±2, manufactured by Sanyo Chemical Industries, Ltd.), and 1,3-propanediol whose number-average molecular weight was 90 (1-PD, hydroxyl group equivalent:

45, OH value: 1,474±20, manufactured by Du Pont Kabushiki Kaisha) were measured at a mass ratio of 53.9:31.7:0.5 and mixed with each other.

The urethane polymer contained 60.1% of D-4000 to which IPDI was added, 35.9% of T-5000 to which IPDI was added, 3.5% of 1,3-propanediol to which IPDI was added, 0.5% of an IPDI monomer, and 2.60% of an isocyanate group.

Preparation Example 8: Preparation of Primary Material (A)

A urethane prepolymer with fluidity (primary material (A) (h listed in Table 1)) was obtained in the same manner as in Preparation Example 1 except that polypropylene glycol whose number-average molecular weight was 4,000 (D-4000, trade name: PP-4000, hydroxyl group equivalent: 1,865 to 2,155, OH value: 28±2, manufactured by Sanyo Chemical Industries, Ltd.), polypropylene glycol whose number-average molecular weight was 5,000 (T-5000, trade name: GP-5000, hydroxyl group equivalent: 1,600 to 1,810, OH value: 33±2, manufactured by Sanyo Chemical Industries, Ltd.), and 1,4-butanediol whose number-average molecular weight was 90 (1,4-BD, hydroxyl group equivalent: 45, OH value: 1,247, manufactured by Mitsubishi Chemical Corporation) were measured at a mass ratio of 53.9:31.7:0.6 and mixed with each other.

The urethane polymer contained 60.2% of D-4000 to which IPDI was added, 35.8% of T-5000 to which IPDI was added, 3.5% of 1,4-butanediol to which IPDI was added, 0.6% of an IPDI monomer, and 2.60% of an isocyanate group.

Preparation Example 9: Preparation of Primary Material (A)

A urethane prepolymer with fluidity (primary material (A) (i listed in Table 1)) was obtained in the same manner as in Preparation Example 1 except that polypropylene glycol whose number-average molecular weight was 4,000 (D-4000, trade name: PP-4000, hydroxyl group equivalent: 1,865 to 2,155, OH value: 28±2, manufactured by Sanyo Chemical Industries, Ltd.), polypropylene glycol whose number-average molecular weight was 5,000 (T-5000, trade name: GP-5000, hydroxyl group equivalent: 1,600 to 1,810, OH value: 33±2, manufactured by Sanyo Chemical Industries, Ltd.), and 1,4-butanediol whose number-average molecular weight was 90 (1,4-BD, hydroxyl group equivalent: 45, OH value: 1,247, manufactured by Mitsubishi Chemical Corporation) were measured at a mass ratio of 44.6:37.7:1.2 and mixed with each other and the amount of IPDI to be added was changed from 13.8% by mass to 16.4% by mass.

The urethane polymer contained 49.8% of D-4000 to which IPDI was added, 42.8% of T-5000 to which IPDI was added, 6.8% of 1,4-butanediol to which IPDI was added, 0.6% of an IPDI monomer, and 3.07% of an isocyanate group.

Preparation Example 10: Preparation of Primary Material (A)

Tolylene diisocyanate whose number-average molecular weight was 174 (TDI-80, manufactured by Mitsui Chemicals, Inc. (isomer mixture of 2,4-TDI (80%) and 2,6-TDI (20%)) was added to a solution, in which polypropylene glycol whose number-average molecular weight was 4,000 (D-4000, trade name: PREMINOL S-4004, hydroxyl group equivalent: 1,865 to 2,155, OH value: 28±2, manufactured by ASAHI GLASS CO., LTD.), polypropylene glycol whose number-average molecular weight was 5,000 (T-5000, trade name: GP-5000, hydroxyl group equivalent: 1,600 to 1,810, OH value: 33±2, manufactured by Sanyo Chemical Industries, Ltd.), and 1,4-butanediol whose number-average molecular weight was 90 (1,4-BD, hydroxyl group equivalent: 45, OH value: 1,247, manufactured by Mitsubishi Chemical Corporation) were measured at a mass ratio of 55.5:33.1:0.5 and mixed with each other, at a mass ratio of 10.8 such that the molar equivalent ratio (NCO/OH) became 2.00, and a liquid mixture was formed, and then the liquid mixture was stirred, heated, and reacted at 90° C. for 2.5 hours, thereby obtaining a urethane polymer.

The urethane polymer contained 60.7% of D-4000 to which TDI-80 was added, 36.6% of T-5000 to which TDI-80 was added, 2.2% of 1,4-butanediol to which TDI-80 was added, 0.4% of a TDI-80 monomer, and 2.57% of an isocyanate group.

Preparation Example 11: Preparation of Primary Material (A)

Tolylene diisocyanate whose number-average molecular weight was 174 (TDI-100, manufactured by Mitsui Chemicals, Inc., 2,4-TDI (100%)) was added to a solution, in which polypropylene glycol whose number-average molecular weight was 4,000 (D-4000, trade name: PREMINOL S-4004, OH value: 28±2, manufactured by ASAHI GLASS CO., LTD.), polypropylene glycol whose number-average molecular weight was 5,000 (T-5000, trade name: GP-5000, OH value: 33±2, manufactured by Sanyo Chemical Industries, Ltd.), and 1,4-butanediol whose number-average molecular weight was 90 (1,4-BD, OH value: 1,247, manufactured by Mitsubishi Chemical Corporation) were measured at a mass ratio of 55.5:33.1:0.5 and mixed with each other, at a mass ratio of 10.8 such that the molar equivalent ratio (NCO/OH) became 2.00, and a urethane polymer with fluidity (primary material (A) (j listed in Table 1)) was obtained in the same manner as in Example 10.

The urethane polymer contained 60.7% of D-4000 to which TDI-100 was added, 36.6% of T-5000 to which TDI-100 was added, 2.2% of 1,4-butanediol to which TDI-100 was added, 0.4% of a TDI-100 monomer, and 2.56% of an isocyanate group.

Preparation Example 12: Preparation of Curing Material (B)

16.8 parts by mass of polypropylene glycol whose number-average molecular weight was 5,000 (trade name: FA703, OH value: 33±2, manufactured by Sanyo Chemical Industries, Ltd.), 4.1 parts by mass of DETDA (trade name: ETHACURE 100, manufactured by ALBEMARLE JAPAN CORPORATION), 5.00 parts by mass of a terminal-esterified polyfunctional polyether-based plasticizer (trade name: SK-500, manufactured by Sanyo Chemical Industries, Ltd.), 0.50 parts by mass of a wetting dispersant (trade name: DA-234, Kusumoto Chemicals, Ltd.), 0.10 parts by mass of a pigment (trade name: VT-U08 BLACK, manufactured by Dainichiseika Color & Chemicals Mfg Co., Ltd.), and 0.20 parts by mass of an anti-aging agent (trade name: EVERSORB S2, manufactured by SORT CO., LTD.) were added to form a uniform liquid mixture by stirring the mixture, 68.4 parts by mass of calcium carbonate (trade name: NS#200, manufactured by Shiraishi Calcium Kaisha, Ltd.) was added to the liquid mixture, and the mixture was stirred and mixed for 30 minutes.

Next, 2.0 parts by mass of a solvent (trade name: Swan clean 150, manufactured by Maruzen Petrochemical Co., Ltd.), 0.5 parts by mass of an anti-foaming agent (trade name: LUCANT H-100, manufactured by Mitsui Chemicals, Inc.), 0.4 parts by mass of a curing-accelerating catalyst (trade name: pb-24, manufactured by Katsuzai Chemical Corporation), 2.0 parts by mass of Mineral Spirit (trade name, manufactured by MORITA CHEMICAL INDUSTRIES CO., LTD.) were added to the above-described mixture, stirred, and mixed for 10 minutes, thereby preparing a curing material (B) (x listed in Table 3).

Preparation Example 13: Preparation of Curing Material (B)

A curing material (B) (y listed in Table 3) was prepared in the same manner as in Preparation Example 12 except that 19.2 parts by mass of polypropylene glycol whose number-average molecular weight was 5,000 (trade name: FA703, OH value: 33±2, manufactured by Sanyo Chemical Industries, Ltd.) and 4.0 parts by mass of DETDA (trade name: ETHACURE 100, manufactured by ALBEMARLE JAPAN CORPORATION) were added.

Preparation Example 14: Preparation of Curing Material (B)

A curing material (B) (z listed in Table 3) was prepared in the same manner as in Preparation Example 12 except that 21.6 parts by mass of polypropylene glycol whose number-average molecular weight was 5,000 (trade name: FA703, OH value: 33±2, manufactured by Sanyo Chemical Industries, Ltd.) and 3.9 parts by mass of DETDA (trade name: ETHACURE 100, manufactured by ALBEMARLE JAPAN CORPORATION) were added.

Preparation Example 15: Preparation of Curing Material (B)

A curing material (B) (s listed in Table 3) was prepared in the same manner as in Preparation Example 12 except that 16.8 parts by mass of polypropylene glycol whose number-average molecular weight was 5,000 (trade name: FA703, OH value: 33±2, manufactured by Sanyo Chemical Industries, Ltd.) was added.

Preparation Example 16: Preparation of Curing Material (B)

A curing material (B) (t-2.5 listed in Table 3) was prepared in the same manner as in Preparation Example 12 except that 5.0 parts by mass of DOP (trade name: DOP, manufactured by Taoka Chemical Co., Ltd.) was added as a plasticizer in place of SK-500.

Preparation Example 17: Preparation of Curing Material (B)

A curing material (B) (t-5.0 listed in Table 3) was prepared in the same manner as in Preparation Example 12 except that 10.0 parts by mass of DOP (trade name: DOP, manufactured by Taoka Chemical Co., Ltd.) was added as a plasticizer in place of SK-500.

Preparation Example 18: Preparation of Curing Material (B)

A curing material (B) (t-7.5 listed in Table 3) was prepared in the same manner as in Preparation Example 12 except that 15.0 parts by mass of DOP (trade name: DOP, manufactured by Taoka Chemical Co., Ltd.) was added as a plasticizer in place of SK-500.

Preparation Example 19: Preparation of Curing Material (B)

A curing material (B) (u-2.5 listed in Table 3) having the same composition as that in Preparation Example 12 was re-prepared.

Preparation Example 20: Preparation of Curing Material (B)

A curing material (B) (u-5.0 listed in Table 3) was prepared in the same manner as in Preparation Example 12 except that 10.0 parts by mass of a terminal-esterified polyfunctional polyether-based plasticizer (trade name: SK-500, manufactured by Sanyo Chemical Industries, Ltd.) was added.

Preparation Example 21: Preparation of Curing Material (B)

A curing material (B) (u-7.5 listed in Table 3) was prepared in the same manner as in Preparation Example 12 except that 15.0 parts by mass of a terminal esterified polyfunctional polyether-based plasticizer (trade name: SK-500, manufactured by Sanyo Chemical Industries, Ltd.) was added.

Preparation Example 22: Preparation of Curing Material (B)

A curing material (B) (v listed in Table 3) was prepared in the same manner as in Preparation Example 12 except that 3.7 parts by mass of DETDA (trade name: ETHACURE 100, manufactured by ALBEMARLE JAPAN CORPORATION) and 0.07 parts by mass of water were added.

Preparation Example 23: Preparation of Curing Material (B)

A curing material (B) (w listed in Table 3) was prepared in the same manner as in Preparation Example 12 except that 3.0 parts by mass of DETDA (trade name: ETHACURE 100, manufactured by ALBEMARLE JAPAN CORPORATION) and 0.13 parts by mass of water were added, and 0.1 parts by mass of water was further added.

Preparation Example 24: Preparation of Curing Material (B)

A curing material (B) (r listed in Table 3) was prepared in the same manner as in Preparation Example 12 except that 19.8 parts by mass of polypropylene glycol whose number-average molecular weight was 5,000 (trade name: FA703, OH value: 33±2, manufactured by Sanyo Chemical Industries, Ltd.) and 4.9 parts by mass of DETDA (trade name: ETHACURE 100, manufactured by ALBEMARLE JAPAN CORPORATION) were added.

Preparation Example 25: Preparation of Curing Material (B)

A curing material (B) (m listed in Table 3) was prepared in the same manner as in Preparation Example 12 except that 0.1 parts of a catalyst Formate S-9 (manufactured by Mitsui Chemicals, Inc.) was added.

Preparation Example 26: Preparation of Curing Material (B)

A curing material (B) (n listed in Table 3) was prepared in the same manner as in Preparation Example 12 except that 1.7 parts by mass of polypropylene glycol whose number-average molecular weight was 5,000 (trade name: FA703, OH value: 33±2, manufactured by Sanyo Chemical Industries, Ltd.) and 0.1 parts of a catalyst Formate S-9 (manufactured by Mitsui Chemicals, Inc.) were added.

TABLE 1

| | Preparation Example | | | | | | | | |
|---|---|---|---|---|---|---|---|---|---|
| | 1 | 2 | 3 | 4 | 5 | 6 | 7 | 8 | 9 |
| Name of raw material | a | b | c | d | e | f | g | h | i |
| D-4000 (low monomer) | 25.7 | 44.2 | 50.0 | 51.5 | 53.9 | 53.9 | 53.9 | | |
| D-4000 (general-purpose) | | | | | | | | 53.9 | 44.6 |
| T-5000 | 34.5 | 33.2 | 33.2 | 33.3 | 31.6 | 31.7 | 31.7 | 31.7 | 37.7 |
| D-2000 | 25.9 | | | | | | | | |
| D-1000 | | 8.8 | | | | | | | |
| D-400 | | | 2.9 | | | | | | |
| D-200 | | | | 1.4 | | | | | |
| 1,4-BD | | | | | 0.6 | | | 0.6 | 1.2 |
| 2-MPD | | | | | | 0.6 | | | |
| 1,3-PD | | | | | | | 0.5 | | |
| IPDI | 13.8 | 13.8 | 13.8 | 13.8 | 13.8 | 13.8 | 13.8 | 13.8 | 16.4 |
| Formate S-9 | 0.1 | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 | 100.0 |
| (NCO/OH)INDEX | 2.00 | 2.00 | 2.00 | 2.00 | 1.99 | 2.00 | 2.00 | 2.00 | 2.00 |
| NCO % | 2.60 | 2.60 | 2.60 | 2.61 | 2.58 | 2.60 | 2.60 | 2.60 | 3.07 |

TABLE 2

| Preparation Example | 10 | 11 |
|---|---|---|
| Name of raw material | j | l |
| D-4000 (low monomer) | 55.5 | 55.5 |
| T-5000 | 33.1 | 33.1 |
| 1,4-BD | 0.5 | 0.5 |
| TDI-80 | 10.8 | |
| TDI-100 | | 10.8 |
| Total | 100.0 | 100.0 |
| (NCO/OH)INDEX | 2.00 | 2.00 |
| NCO % | 2.57 | 2.56 |

TABLE 3

| | Preparation Example | | | | | | | |
|---|---|---|---|---|---|---|---|---|
| | 12 | 13 | 14 | 15 | 16 | 17 | 18 | 19 |
| Name of raw material | x | y | z | s | t-2.5 | t-5.0 | t-7.5 | u-2.5 |
| T-5000EO | 16.8 | 19.2 | 21.6 | 16.8 | 16.8 | 16.8 | 16.8 | 16.8 |
| DETDA | 4.1 | 4.0 | 3.9 | 4.1 | 4.1 | 4.1 | 4.1 | 4.1 |
| Water | 0.0 | 0.0 | 0.0 | 0.0 | 0.0 | 0.0 | 0.0 | 0.0 |
| LUCANT H-100 | 0.5 | 0.5 | 0.5 | 0.5 | 0.5 | 0.5 | 0.5 | 0.5 |
| SK-500 | 5.0 | 5.0 | 5.0 | 0.0 | 0.0 | 0.0 | 0.0 | 5.0 |
| DOP | 0.0 | 0.0 | 0.0 | 0.0 | 5.0 | 10.0 | 15.0 | 0.0 |
| DA-234 | 0.5 | 0.5 | 0.5 | 0.5 | 0.5 | 0.5 | 0.5 | 0.5 |
| NS#200 | 68.4 | 68.4 | 68.4 | 68.4 | 68.4 | 68.4 | 68.4 | 68.4 |
| S-02 | 0.2 | 0.2 | 0.2 | 0.2 | 0.2 | 0.2 | 0.2 | 0.2 |
| Formate S-9 | 0.0 | 0.0 | 0.0 | 0.0 | 0.0 | 0.0 | 0.0 | 0.0 |
| VT-U 08 black | 0.1 | 0.1 | 0.1 | 0.1 | 0.1 | 0.1 | 0.1 | 0.1 |
| pb-24 | 0.4 | 0.4 | 0.4 | 0.4 | 0.4 | 0.4 | 0.4 | 0.4 |
| Swan Clean 150 | 2.0 | 2.0 | 2.0 | 2.0 | 2.0 | 2.0 | 2.0 | 2.0 |
| Mineral Spirit | 2.0 | 2.0 | 2.0 | 2.0 | 2.0 | 2.0 | 2.0 | 2.0 |
| Total | 100.0 | 102.3 | 104.5 | 95.0 | 100.0 | 105.0 | 110.0 | 100.0 |
| $NH_2/(NH_2 + OH)$ | 0.825 | 0.800 | 0.775 | 0.825 | 0.825 | 0.825 | 0.825 | 0.825 |

| | Preparation Example | | | | | | |
|---|---|---|---|---|---|---|---|
| | 20 | 21 | 22 | 23 | 24 | 25 | 26 |
| Name of raw material | u-5.0 | u-7.5 | v | w | r | m | n |
| T-5000EO | 16.8 | 16.8 | 16.8 | 16.8 | 19.8 | 16.8 | 1.7 |
| DETDA | 4.1 | 4.1 | 3.7 | 3.0 | 4.9 | 4.1 | 4.1 |
| Water | 0.0 | 0.0 | 0.1 | 0.1 | 0.0 | 0.0 | 0.0 |
| LUCANT H-100 | 0.5 | 0.5 | 0.5 | 0.5 | 0.5 | 0.5 | 0.5 |
| SK-500 | 10.0 | 15.0 | 5.0 | 5.0 | 5.0 | 5.0 | 5.0 |
| DOP | 0.0 | 0.0 | 0.0 | 0.0 | 0.0 | 0.0 | 0.0 |
| DA-234 | 0.5 | 0.5 | 0.5 | 0.5 | 0.5 | 0.5 | 0.5 |
| NS#200 | 68.4 | 68.4 | 68.4 | 68.4 | 68.4 | 68.4 | 68.4 |
| S-02 | 0.2 | 0.2 | 0.2 | 0.2 | 0.2 | 0.2 | 0.2 |
| Formate S-9 | 0.0 | 0.0 | 0.0 | 0.0 | 0.0 | 0.1 | 0.1 |
| VT-U 08 black | 0.1 | 0.1 | 0.1 | 0.1 | 0.1 | 0.0 | 0.0 |
| pb-24 | 0.4 | 0.4 | 0.4 | 0.4 | 0.4 | 0.1 | 0.1 |

TABLE 3-continued

| | | | | | | | |
|---|---|---|---|---|---|---|---|
| Swan Clean 150 | 2.0 | 2.0 | 2.0 | 2.0 | 2.0 | 2.0 | 2.0 |
| Mineral Spirit | 2.0 | 2.0 | 2.0 | 2.0 | 2.0 | 2.0 | 2.0 |
| Total | 105.0 | 110.0 | 99.6 | 99.0 | 103.7 | 99.7 | 99.7 |
| $NH_2/(NH_2 + OH)$ | 0.825 | 0.825 | 0.700 | 0.575 | 0.825 | 0.825 | 0.825 |

Example 1

Preparation of Urethane Composition for Coating Film Waterproof Material 100 parts by mass of the curing material (B) (y listed in Table 3) was added to 100 parts by mass of the primary material (A) (a listed in Table 1), the curing material (B) and the primary material (A) were mixed at 1,000 rpm for approximately 3 minutes and vacuum-defoamed, and the obtained mixture was allowed to flow in a coated glass plate coated with a releasing agent, thereby preparing a urethane composition for a coating film waterproof material of Example 1.

In the obtained urethane composition for a coating film waterproof material, NCO and $NH_2$ form a urea bond in the reaction of the primary material (A) and the curing agent (B).

[Evaluation]

The urethane composition for a coating film waterproof material of Example 1 was cured at 23° C. for 24 hours, heated at 60° C. for 24 hours, and then cured, and samples for a tensile test in conformity with a coating film waterproof material for architecture in JIS A 6021 and a urethane coating film waterproof material and samples for a tear strength test in conformity with a coating film waterproof material for architecture in JIS A 6021 and a urethane coating film waterproof material were prepared.

The tensile strength and the elongation rate between marked lines were measured using the samples for a tensile test according to a method in conformity with the coating film waterproof material for architecture in JIS A 6021 and the urethane coating film waterproof material. The results thereof are listed in Table 4.

The tear strength was measured using the samples for a tear strength test according to a method in conformity with the coating film waterproof material for architecture in JIS A 6021 and the urethane coating film waterproof material. The results thereof are listed in Table 4.

Example 2

A urethane composition for a coating film waterproof material of Example 2 was prepared in the same manner as in Example 1 except that 100 parts by mass of the curing material (B) (y listed in Table 3) was added to 100 parts by mass of the primary material (A) (b listed in Table 1).

Further, the tensile strength, the elongation rate between marked lines, and tear strength of the urethane composition for a coating film waterproof material of Example 2 were measured in the same manner as in Example 1. The results thereof are listed in Table 4.

Example 3

A urethane composition for a coating film waterproof material of Example 3 was prepared in the same manner as in Example 1 except that 100 parts by mass of the curing material (B) (y listed in Table 3) was added to 100 parts by mass of the primary material (A) (c listed in Table 1).

Further, the tensile strength, the elongation rate between marked lines, and tear strength of the urethane composition for a coating film waterproof material of Example 3 were measured in the same manner as in Example 1. The results thereof are listed in Table 4.

Example 4

A urethane composition for a coating film waterproof material of Example 4 was prepared in the same manner as in Example 1 except that 100 parts by mass of the curing material (B) (y listed in Table 3) was added to 100 parts by mass of the primary material (A) (d listed in Table 1).

Further, the tensile strength, the elongation rate between marked lines, and tear strength of the urethane composition for a coating film waterproof material of Example 4 were measured in the same manner as in Example 1. The results thereof are listed in Table 4.

Example 5

A urethane composition for a coating film waterproof material of Example 5 was prepared in the same manner as in Example 1 except that 100 parts by mass of the curing material (B) (x listed in Table 3) was added to 100 parts by mass of the primary material (A) (e listed in Table 1).

Further, the tensile strength, the elongation rate between marked lines, and tear strength of the urethane composition for a coating film waterproof material of Example 5 were measured in the same manner as in Example 1. The results thereof are listed in Table 4.

Example 6

A urethane composition for a coating film waterproof material of Example 6 was prepared in the same manner as in Example 1 except that 100 parts by mass of the curing material (B) (y listed in Table 3) was added to 100 parts by mass of the primary material (A) (e listed in Table 1).

Further, the tensile strength, the elongation rate between marked lines, and tear strength of the urethane composition for a coating film waterproof material of Example 6 were measured in the same manner as in Example 1. The results thereof are listed in Table 4.

Example 7

A urethane composition for a coating film waterproof material of Example 7 was prepared in the same manner as in Example 1 except that 100 parts by mass of the curing material (B) (z listed in Table 3) was added to 100 parts by mass of the primary material (A) (e listed in Table 1).

Further, the tensile strength, the elongation rate between marked lines, and tear strength of the urethane composition for a coating film waterproof material of Example 7 were measured in the same manner as in Example 1. The results thereof are listed in Table 4.

Example 8

A urethane composition for a coating film waterproof material of Example 8 was prepared in the same manner as in Example 1 except that 100 parts by mass of the curing material (B) (y listed in Table 3) was added to 100 parts by mass of the primary material (A) (f listed in Table 1).

Further, the tensile strength, the elongation rate between marked lines, and tear strength of the urethane composition for a coating film waterproof material of Example 8 were measured in the same manner as in Example 1. The results thereof are listed in Table 4.

Example 9

A urethane composition for a coating film waterproof material of Example 9 was prepared in the same manner as in Example 1 except that 100 parts by mass of the curing material (B) (y listed in Table 3) was added to 100 parts by mass of the primary material (A) (g listed in Table 1).

Further, the tensile strength, the elongation rate between marked lines, and tear strength of the urethane composition for a coating film waterproof material of Example 9 were measured in the same manner as in Example 1. The results thereof are listed in Table 4.

Example 10

A urethane composition for a coating film waterproof material of Example 10 was prepared in the same manner as in Example 1 except that 100 parts by mass of the curing material (B) (s listed in Table 3) was added to 100 parts by mass of the primary material (A) (g listed in Table 1).

Further, the tensile strength, the elongation rate between marked lines, and tear strength of the urethane composition for a coating film waterproof material of Example 10 were measured in the same manner as in Example 1. The results thereof are listed in Table 4.

Example 11

A urethane composition for a coating film waterproof material of Example 11 was prepared in the same manner as in Example 1 except that 100 parts by mass of the curing material (B) (t-2.5 listed in Table 3) was added to 100 parts by mass of the primary material (A) (g listed in Table 1).

Further, the tensile strength, the elongation rate between marked lines, and tear strength of the urethane composition for a coating film waterproof material of Example 11 were measured in the same manner as in Example 1. The results thereof are listed in Table 4.

Example 12

A urethane composition for a coating film waterproof material of Example 12 was prepared in the same manner as in Example 1 except that 100 parts by mass of the curing material (B) (t-5.0 listed in Table 3) was added to 100 parts by mass of the primary material (A) (g listed in Table 1).

Further, the tensile strength, the elongation rate between marked lines, and tear strength of the urethane composition for a coating film waterproof material of Example 12 were measured in the same manner as in Example 1. The results thereof are listed in Table 5.

Example 13

A urethane composition for a coating film waterproof material of Example 13 was prepared in the same manner as in Example 1 except that 100 parts by mass of the curing material (B) (t-7.5 listed in Table 3) was added to 100 parts by mass of the primary material (A) (g listed in Table 1).

Further, the tensile strength, the elongation rate between marked lines, and tear strength of the urethane composition for a coating film waterproof material of Example 13 were measured in the same manner as in Example 1. The results thereof are listed in Table 5.

Example 14

A urethane composition for a coating film waterproof material of Example 14 was prepared in the same manner as in Example 1 except that 100 parts by mass of the curing material (B) (u-2.5 listed in Table 3) was added to 100 parts by mass of the primary material (A) (g listed in Table 1).

Further, the tensile strength, the elongation rate between marked lines, and tear strength of the urethane composition for a coating film waterproof material of Example 14 were measured in the same manner as in Example 1. The results thereof are listed in Table 5.

Example 15

A urethane composition for a coating film waterproof material of Example 15 was prepared in the same manner as in Example 1 except that 100 parts by mass of the curing material (B) (u-5.0 listed in Table 3) was added to 100 parts by mass of the primary material (A) (g listed in Table 1).

Further, the tensile strength, the elongation rate between marked lines, and tear strength of the urethane composition for a coating film waterproof material of Example 15 were measured in the same manner as in Example 1. The results thereof are listed in Table 5.

Example 16

A urethane composition for a coating film waterproof material of Example 16 was prepared in the same manner as in Example 1 except that 100 parts by mass of the curing material (B) (u-7.5 listed in Table 3) was added to 100 parts by mass of the primary material (A) (g listed in Table 1).

Further, the tensile strength, the elongation rate between marked lines, and tear strength of the urethane composition for a coating film waterproof material of Example 16 were measured in the same manner as in Example 1. The results thereof are listed in Table 5.

Example 17

A urethane composition for a coating film waterproof material of Example 17 was prepared in the same manner as in Example 1 except that 100 parts by mass of the curing material (B) (v listed in Table 3) was added to 100 parts by mass of the primary material (A) (e listed in Table 1).

Further, the tensile strength, the elongation rate between marked lines, and tear strength of the urethane composition for a coating film waterproof material of Example 17 were measured in the same manner as in Example 1. The results thereof are listed in Table 5.

Example 18

A urethane composition for a coating film waterproof material of Example 18 was prepared in the same manner as in Example 1 except that 100 parts by mass of the curing material (B) (w listed in Table 3) was added to 100 parts by mass of the primary material (A) (e listed in Table 1).

Further, the tensile strength, the elongation rate between marked lines, and tear strength of the urethane composition for a coating film waterproof material of Example 18 were measured in the same manner as in Example 1. The results thereof are listed in Table 5.

Example 19

A urethane composition for a coating film waterproof material of Example 19 was prepared in the same manner as in Example 1 except that 100 parts by mass of the curing material (B) (x listed in Table 3) was added to 100 parts by mass of the primary material (A) (h listed in Table 1).

Further, the tensile strength, the elongation rate between marked lines, and tear strength of the urethane composition for a coating film waterproof material of Example 19 were measured in the same manner as in Example 1. The results thereof are listed in Table 5.

Example 20

A urethane composition for a coating film waterproof material of Example 20 was prepared in the same manner as in Example 1 except that 100 parts by mass of the curing material (B) (r listed in Table 3) was added to 100 parts by mass of the primary material (A) (i listed in Table 1).

Further, the tensile strength, the elongation rate between marked lines, and tear strength of the urethane composition for a coating film waterproof material of Example 20 were measured in the same manner as in Example 1. The results thereof are listed in Table 5.

Example 21

A urethane composition for a coating film waterproof material of Example 21 was prepared in the same manner as in Example 1 except that 100 parts by mass of the curing material (B) (m listed in Table 3) was added to 100 parts by mass of the primary material (A) (j listed in Table 2).

Further, the tensile strength, the elongation rate between marked lines, and tear strength of the urethane composition for a coating film waterproof material of Example 21 were measured in the same manner as in Example 1. The results thereof are listed in Table 5.

Example 22

A urethane composition for a coating film waterproof material of Example 22 was prepared in the same manner as in Example 1 except that 100 parts by mass of the curing material (B) (n listed in Table 3) was added to 100 parts by mass of the primary material (A) (l listed in Table 2).

Further, the tensile strength, the elongation rate between marked lines, and tear strength of the urethane composition for a coating film waterproof material of Example 22 were measured in the same manner as in Example 1. The results thereof are listed in Table 5.

TABLE 4

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Primary material (component A) | a | b | c | d | e | e | e | f | g | g | g |
| Curing material (component B) | y | y | y | y | x | y | z | y | y | s | t-2.5 |
| Tensile strength (N/mm$^2$) | 8.82 | 9.37 | 9.30 | 9.52 | 11.11 | 10.73 | 10.29 | 9.86 | 10.32 | 12.61 | 11.17 |
| Elongation rate between marked lines (%) | 1027 | 1000 | 983 | 993 | 683 | 712 | 717 | 684 | 706 | 870 | 855 |
| Tear strength (N/mm) | 36.7 | 37.3 | 37.1 | 38.8 | 41.5 | 40.9 | 39.4 | 40.7 | 41.0 | 48.0 | 45.7 |

TABLE 5

| | Example | | | | | | | | | | |
|---|---|---|---|---|---|---|---|---|---|---|---|
| | 12 | 13 | 14 | 15 | 16 | 17 | 18 | 19 | 20 | 21 | 22 |
| Primary material (component A) | g | g | g | g | g | e | e | h | i | j | l |
| Curing material (component B) | t-5.0 | t-7.5 | u-2.5 | u-5.0 | u-7.5 | v | w | x | r | m | n |
| Tensile strength (N/mm$^2$) | 10.78 | 9.17 | 11.89 | 10.83 | 10.79 | 11.71 | 11.10 | 2.99 | 3.54 | 6.64 | 7.02 |
| Elongation rate between marked lines (%) | 903 | 890 | 890 | 900 | 937 | 950 | 920 | 945 | 788 | 743 | 783 |
| Tear strength (N/mm) | 42.7 | 41.1 | 45.2 | 42.2 | 39.0 | 42.9 | 38.9 | 26.6 | 27.2 | 35.2 | 33.7 |

From the results of Tables 4 and 5, it was confirmed that the urethane compositions of a coating film waterproof material of Examples 5, 6, 7, 9, 10, 11, 12, 14, 15, 16, 17, and 18 were capable of forming a waterproof coating film excellent in tensile strength, an elongation rate between marked lines, and tear strength.

In addition, a urethane composition for a coating film waterproof material whose tensile strength is 10.0 N/mm$^2$ or greater, tear strength is 30.0 N/mm or greater, and elongation rate between marked lines is 450% or greater is considered to have excellent bleed resistance in Examples.

Preparation Example 27: Preparation of Curing Material (B)

A curing material (B) (x-2 listed in Table 6) was prepared in the same manner as in Preparation Example 12 except that 4.0 parts by mass of a solvent (trade name: Swan clean 150, manufactured by Maruzen Petrochemical Co., Ltd.) was added.

Preparation Example 28: Preparation of Curing Material (B)

A curing material (B) (x-3 listed in Table 6) was prepared in the same manner as in Preparation Example 12 except that 4.0 parts by mass of a solvent (trade name: Swan clean 150, manufactured by Maruzen Petrochemical Co., Ltd.) and 0.1 parts by mass of pb-24 (trade name: pb-24, manufactured by Katsuzai Chemical Corporation) were added.

Preparation Example 29: Preparation of Curing Material (B)

A curing material (B) (x-4 listed in Table 6) was prepared in the same manner as in Preparation Example 12 except that 4.0 parts by mass of a solvent (trade name: Swan clean 150, manufactured by Maruzen Petrochemical Co., Ltd.) was added and pb-24 (trade name: pb-24, manufactured by Katsuzai Chemical Corporation) was not added.

Preparation Example 30: Preparation of Curing Material (B)

A curing material (B) (x-5 listed in Table 6) was prepared in the same manner as in Preparation Example 12 except that pb-24 (trade name: pb-24, manufactured by Katsuzai Chemical Corporation) was not added.

Example 23

Evaluation of Usable Time of Urethane Composition for Coating Film Waterproof Material The usable time of a urethane composition for a coating film waterproof material of Example 23 was evaluated by adding 100 parts by mass of the curing material (B) (x listed in Table 3) to 100 parts by mass of the primary material (A) (e listed in Table 1) and measuring the viscosity thereof at 20 rotations/min for every 5 minutes using a BH type viscometer. The results thereof are listed in Table 7.

Example 24

The usable time of a urethane composition for a coating film waterproof material of Example 24 was evaluated in the same manner as in Example 23 except that 100 parts by mass of the curing material (B) (x-2 listed in Table 6) was added to 100 parts by mass of the primary material (A) (e listed in Table 1). The results thereof are listed in Table 7.

Example 25

The usable time of a urethane composition for a coating film waterproof material of Example 25 was evaluated in the same manner as in Example 23 except that 100 parts by mass of the curing material (B) (x-3 listed in Table 6) was added to 100 parts by mass of the primary material (A) (e listed in Table 1). The results thereof are listed in Table 7.

Example 26

The usable time of a urethane composition for a coating film waterproof material of Example 26 was evaluated in the same manner as in Example 23 except that 100 parts by mass of the curing material (B) (x-4 listed in Table 6) was added to 100 parts by mass of the primary material (A) (e listed in Table 1). The results thereof are listed in Table 7.

Example 27

The usable time of a urethane composition for a coating film waterproof material of Example 27 was evaluated in the same manner as in Example 23 except that 100 parts by mass of the curing material (B) (x-5 listed in Table 6) was added to 100 parts by mass of the primary material (A) (e listed in Table 1). The results thereof are listed in Table 7.

Example 28

The usable time of a urethane composition for a coating film waterproof material of Example 28 was evaluated in the same manner as in Example 23 except that 100 parts by mass of the curing material (B) (v listed in Table 3) was added to 100 parts by mass of the primary material (A) (e listed in Table 1). The results thereof are listed in Table 7.

Example 29

The usable time of a urethane composition for a coating film waterproof material of Example 29 was evaluated in the same manner as in Example 23 except that 100 parts by mass of the curing material (B) (w listed in Table 3) was added to 100 parts by mass of the primary material (A) (e listed in Table 1). The results thereof are listed in Table 7.

Example 30

The usable time of a urethane composition for a coating film waterproof material of Example 30 was evaluated in the same manner as in Example 23 except that 100 parts by mass of the curing material (B) (x-5 listed in Table 6) was added to 100 parts by mass of the primary material (A) (j listed in Table 2). The results thereof are listed in Table 7.

Example 31

The usable time of a urethane composition for a coating film waterproof material of Example 31 was evaluated in the same manner as in Example 23 except that 100 parts by mass of the curing material (B) (x-5 listed in Table 6) was added to 100 parts by mass of the primary material (A) (l listed in Table 2). The results thereof are listed in Table 7.

TABLE 6

| Preparation Example | 27 | 28 | 29 | 30 |
|---|---|---|---|---|
| Name of raw material | x-2 | x-3 | x-4 | x-5 |
| T-5000E0 | 16.8 | 19.2 | 21.6 | 16.8 |
| DETDA | 4.1 | 4.0 | 3.9 | 4.1 |
| Water | 0.0 | 0.0 | 0.0 | 0.0 |
| LUCANT H-100 | 0.5 | 0.5 | 0.5 | 0.5 |
| SK-500 | 5.0 | 5.0 | 5.0 | 0.0 |
| DOP | 0.0 | 0.0 | 0.0 | 0.0 |

TABLE 6-continued

| Preparation Example | 27 | 28 | 29 | 30 |
|---|---|---|---|---|
| DA-234 | 0.5 | 0.5 | 0.5 | 0.5 |
| NS#200 | 68.4 | 68.4 | 68.4 | 68.4 |
| S-02 | 0.2 | 0.2 | 0.2 | 0.2 |
| Formate S-9 | 0.0 | 0.0 | 0.0 | 0.0 |
| VT-U 08 black | 0.1 | 0.1 | 0.1 | 0.1 |
| pb-24 | 0.4 | 0.1 | 0.0 | 0.0 |
| Swan Clean 150 | 4.0 | 4.0 | 4.0 | 2.0 |
| Mineral Spirit | 2.0 | 2.0 | 2.0 | 2.0 |
| Total | 100.0 | 102.3 | 104.5 | 95.0 |
| $NH_2/(NH_2 + OH)$ | 0.825 | 0.800 | 0.775 | 0.825 |

TABLE 7

| | | Example | | | | | | | | |
|---|---|---|---|---|---|---|---|---|---|---|
| | | 23 | 24 | 25 | 26 | 27 | 28 | 29 | 30 | 31 |
| Primary material (component A) | | E | E | E | E | E | E | E | J | L |
| Primary material (component B) | | X-1 | X-2 | X-3 | X-4 | X-5 | V | W | X-5 | X-5 |
| 5 minutes | 20 rotations | 7,400 | 6,400 | 5,200 | 4.940 | 7,200 | 7,400 | 5,900 | 11,400 | 13,500 |
| | T.I. value | 1.30 | 1.25 | 1.15 | 1.05 | 1.11 | 1.08 | 1.08 | 1.00 | 0.96 |
| 10 minutes | 20 rotations | 10,520 | 8,800 | 6,400 | 6,000 | 9,000 | 8,600 | 6,900 | 30,000 | 35,000 |
| | T.I. value | 1.33 | 1.36 | 1.19 | 1.10 | 1.11 | 1.16 | 1.13 | 1.00 | 1.00 |
| 15 minutes | 20 rotations | 15,800 | 13,200 | 8,760 | 8,000 | 11,800 | 10,900 | 8,500 | | |
| | T.I. value | 1.27 | 1.26 | 1.10 | 1.00 | 1.08 | 1.12 | 1.06 | | |
| 20 minutes | 20 rotations | 28,800 | 20,600 | 12,040 | 11,300 | 15,500 | 14,400 | 10,900 | | |
| | T.I. value | 0.96 | 1.19 | 1.06 | 1.03 | 1.07 | 1.08 | 1.03 | | |
| 25 minutes | 20 rotations | 38,650 | 32,300 | 17,660 | 16,000 | 23,000 | 19,000 | 13,900 | | |
| | T.I. value | 1.10 | 1.11 | 1.04 | 1.00 | 1.04 | 1.05 | 1.04 | | |
| 30 minutes | 20 rotations | | | 28,000 | 24,000 | 31,750 | 25,750 | 17,800 | | |
| | T.I. value | | | 1.00 | 1.00 | 1.01 | 1.03 | 1.02 | | |
| 35 minutes | 20 rotations | | | 41,500 | 35,000 | 47,500 | 34,000 | 22,500 | | |
| | T.I. value | | | 1.00 | 1.00 | 1.01 | 1.03 | 1.00 | | |
| 40 minutes | 20 rotations | | | | | | 46,000 | 28,250 | | |
| | T.I. value | | | | | | 1.03 | 1.01 | | |
| 45 minutes | 20 rotations | | | | | | | 36,000 | | |
| | T.I. value | | | | | | | 1.01 | | |
| 50 minutes | 20 rotations | | | | | | | 46,750 | | |
| | T.I. value | | | | | | | 1.02 | | |

From the results of Table 7, it is confirmed that the urethane compositions for a coating film waterproof material of Examples 25 to 29 have a long usable time and are suitable for hand-coating for water-discharging construction. Particularly, the urethane compositions of Examples 28 and 29 have a long usable time and are suitable for hand-coating construction in summer.

INDUSTRIAL APPLICABILITY

Since the urethane composition for a coating film waterproof material of the present invention has work efficiency which is the same as that of a general-purpose highly extensible urethane coating film waterproof material (former Group 1), an elongation rate of the highly extensible urethane coating film waterproof material (former Group 1), and strength of the high-strength urethane coating film waterproof material, the urethane composition for a coating film waterproof material having physical properties according to applications including a highly extensible urethane coating film waterproof material (former Group 1) used for normal roofs or a high-strength urethane coating film waterproof material used for exposed waterproof material in a rooftop parking lot can be provided.

Moreover, since weather resistance of a top coat resulting from a plasticizer is not decreased, the urethane composition for a coating film waterproof material can be provided for applications, for which long-term durability is required, such as articles or sites in which maintenance is not easily done.

Further, since the urethane composition for a coating film waterproof material is not affected by migration of a low fraction of asphalt, the urethane composition can be provided as a coating film waterproof material for applications such as in renovation or repair according to an exposed asphalt waterproof construction method. Currently, a urethane coating film waterproof material which does not use TDI or MOCA that is a specific chemical substance and has high water resistance and hot water resistance is desired.

The urethane composition for a coating film waterproof material is used for applications such as in a kitchen or a bathroom in which concrete or mortar for which water resistance is required is poured because the urethane composition for a coating film waterproof material has hydrophobicity with an SP value in which asphalt is uniformly dispersed.

Further, since the urethane composition for a coating film waterproof material does not contain any of specific chemical substances in the Occupational Safety and Health Act, an impact on workers handling the urethane composition for a coating film waterproof material in manufacturing processes or civil engineering and construction sites is reduced.

REFERENCE SIGNS LIST

1: concrete of roof portion
2: primer
3: waterproof layer
4: top coat
11: floor slab concrete
12: primer
13: waterproof layer
14: interlayer adhesive
15: finishing concrete

The invention claimed is:

1. A urethane composition for a coating film waterproof material comprising:
   a primary material (A) which contains an isophorone diisocyanate prepolymer formed as a reaction of low-monol polypropylene glycol having a degree of unsaturation of 0.05 meq/g or less, two or more hydroxyl groups and a hydroxyl number in a range of from 28 to 57, and short-chain polyhydric alcohol with isophorone diisocyanate; and
   a curing material (B) which contains diethyl toluene diamine, and polypropylene glycol, which has two or more hydroxyl groups and a hydroxyl number in a range of from 28 to 57, and a terminal-esterified polyfunctional polyether-based plasticizer or a polyoxyalkylene monoalkyl ether acetate ester-based plasticizer;
   wherein the short-chain polyhydric alcohol is at least one selected from the group consisting of ethylene glycol, dipropylene glycol, 1,3-propanediol, 2-methyl 1,3-propanediol, 1,4-butanediol, 3-methyl 1,5-pentanediol, 1,6-hexanediol, glycerin, and trimethylol propane.

2. A urethane composition for a coating film waterproof material comprising:
   a primary material (A) containing an isophorone diisocyanate prepolymer formed as a reaction of low-monol polypropylene glycol having a degree of unsaturation of 0.05 meq/g or less, two or more hydroxyl groups and a hydroxyl number in a range of from 28 to 57, and polyhydric alcohol with isophorone diisocyanate; and
   a curing material (B) containing diethyl toluene diamine, and polypropylene glycol, which has two or more hydroxyl groups and a hydroxyl number in a range of from 28 to 57, and a plasticizer including a terminal-esterified polyfunctional polyether or a polyoxyalkylene monoalkyl ether acetate ester.

3. The urethane composition according to claim 1, wherein a molar equivalent ratio of isocyanate group (NCO group) of the isophorone diisocyanate to a hydroxyl group (OH) of the polypropylene glycol in the primary material (A) is in a range of from 1.8 to 2.2.

4. The urethane composition according to claim 1, wherein the isophorone diisocyanate prepolymer contains 98% by mass to 100% by mass of a urethane prepolymer obtained from reaction of isophorone diisocyanate and polypropylene glycol.

5. The urethane composition according to claim 1, wherein the primary material contains an isocyanate group in an amount in a range of from 2.4% by mass to 3.0% by mass.

6. The urethane composition according to claim 1, wherein the curing material (B) further comprises water.

7. A coating film waterproof material formed from the composition according to claim 1, which has a tensile strength of 10 N/mm² or more.

8. A method comprising coating the urethane composition according to claim 1 on a roof or rooftop parking lot to form a coating film waterproof material for the roof or rooftop parking lot.

9. The urethane composition according to claim 2, wherein a molar equivalent ratio of isocyanate group (NCO group) of the isophorone diisocyanate to a hydroxyl group (OH) of the polypropylene glycol in the primary material (A) is in a range of from 1.8 to 2.2.

10. The urethane composition according to claim 2, wherein the isophorone diisocyanate prepolymer contains 98% by mass to 100% by mass of a urethane prepolymer obtained from reaction of isophorone diisocyanate and polypropylene glycol.

11. The urethane composition according to claim 2, wherein the primary material contains an isocyanate group in an amount in a range of from 2.4% by mass to 3.0% by mass.

12. The urethane composition according to claim 2, wherein the curing material (B) further comprises water.

13. A coating film waterproof material formed from the composition according to claim 2, which has a tensile strength of 10 N/mm² or more.

14. A method comprising coating the urethane composition according to claim 2 on a roof or rooftop parking lot to form a coating film waterproof material for the roof or rooftop parking lot.

* * * * *